US008508162B2

(12) United States Patent
Choi et al.

(10) Patent No.: US 8,508,162 B2

(45) Date of Patent: Aug. 13, 2013

(54) SYSTEM AND METHOD FOR CONTROLLING TORQUE OF INDUCTION MOTOR IN ELECTRIC VEHICLE

(75) Inventors: Gi Young Choi, Seongnam-si (KR); Sun Woo Lee, Seoul (KR)

(73) Assignee: LSIS Co., Ltd., Anyang-Si, Gyeonggi-Do (KR)

(*) Notice: Subject to any disclaimer, the term of this patent is extended or adjusted under 35 U.S.C. 154(b) by 111 days.

(21) Appl. No.: 13/335,874

(22) Filed: Dec. 22, 2011

(65) Prior Publication Data

US 2012/0169268 A1 Jul. 5, 2012

(30) Foreign Application Priority Data

Dec. 30, 2010 (KR) ........................ 10-2010-0139464

(51) Int. Cl.
*H02P 6/14* (2006.01)
*H02P 21/14* (2006.01)

(52) U.S. Cl.
USPC ................. 318/400.13; 318/400.02; 318/432; 318/768; 363/37; 363/40

(58) Field of Classification Search
USPC ............... 318/400.02, 400.13, 432, 610, 767, 318/727, 802; 363/37, 40
See application file for complete search history.

(56) References Cited

U.S. PATENT DOCUMENTS 5,038,092 A * 8/1991 Asano et al. .................. 318/811
6,137,258 A * 10/2000 Jansen .......................... 318/802
6,407,531 B1 * 6/2002 Walters et al. ................ 318/805
6,492,788 B1 * 12/2002 Agirman et al. .............. 318/700
6,850,033 B1 * 2/2005 Gallegos-Lopez et al. ... 318/807
6,876,169 B2 * 4/2005 Gallegos-Lopez et al. ... 318/701
7,009,856 B2 * 3/2006 Moon et al. ..................... 363/37
7,332,888 B2 * 2/2008 Nagata et al. ................. 318/801
7,671,558 B2 * 3/2010 Yamamoto et al. ........... 318/802
7,723,944 B2 * 5/2010 Kitanaka et al. .............. 318/802
8,228,016 B2 * 7/2012 Gallegos-Lopez et al. ... 318/609
8,278,850 B2 * 10/2012 Gallegos-Lopez ....... 318/400.02
8,450,962 B2 * 5/2013 Wu et al. ....................... 318/610
8,456,115 B2 * 6/2013 Wu et al. .................. 318/400.13
2005/0002210 A1 * 1/2005 Moon et al. ..................... 363/37
2008/0030155 A1 * 2/2008 Patel et al. ............... 318/400.02
2008/0169783 A1 * 7/2008 Yamamoto et al. ........... 318/802
2009/0256518 A1 * 10/2009 Kitanaka et al. .............. 318/802
2009/0284195 A1 * 11/2009 Gallegos-Lopez et al. ........................ 318/400.02
2009/0295316 A1 * 12/2009 Patel et al. ............... 318/400.02
2011/0221365 A1 * 9/2011 Gallegos-Lopez ....... 318/400.02
2012/0212167 A1 * 8/2012 Wu et al. .................. 318/400.13
2012/0212169 A1 * 8/2012 Wu et al. ....................... 318/432
2012/0217923 A1 * 8/2012 Wu et al. ....................... 318/610

* cited by examiner

*Primary Examiner* — Paul Ip

(74) *Attorney, Agent, or Firm* — Lee, Hong, Degerman, Kang & Waimey

(57) ABSTRACT

Disclosed is a system and a method for controlling torque of induction motor in electric vehicle. The system and method for controlling torque of induction motor in electric vehicle according to the present disclosure has an advantageous effect in that torque control problems caused by saturation of magnetic flux, parameters of induction motor and changes in battery voltages during control of torque in the induction motor can be solved using a look-up table (a type of data table), thereby enhancing accuracy in torque control and improving travel performance and fuel efficiency of the electric vehicle.

7 Claims, 4 Drawing Sheets

110
120
121
122
130
140
150
$P^*(T^*\omega)$
$i_d^*$
$P^*$
$\omega^*$
$L_m$
$i_q^*$
$T_r$
$\omega$
$V_{dq}^*$
FLUX CONT-ROLLER
SLIP CALCU-LATOR
SVPWM & Gate Driver
INVERTER
MOTOR

SYSTEM AND METHOD FOR CONTROLLING TORQUE OF INDUCTION MOTOR IN ELECTRIC VEHICLE

Pursuant to 35 U.S.C. §119 (a), this application claims the benefit of earlier filing date and right of priority to Korean Patent Application No. 10-2010-0139464, filed on Dec. 30, 2010, the contents of which is hereby incorporated by reference in their entirety.

BACKGROUND OF THE DISCLOSURE

1. Field

The teachings in accordance with the exemplary embodiments of this present disclosure generally relate to a system and method for controlling torque of induction motor in electric vehicle, and more particularly to a system and method for controlling torque of induction motor in electric vehicle, configured to solve torque control problems caused by saturation of magnetic flux, parameters of induction motor and changes in battery voltages during control of torque in the induction motor using a look-up table, thereby enhancing accuracy in torque control.

2. Background

A method using torque compensation logic was conventionally applied to compensate torque change caused by temperature change in an interior permanent magnet synchronous motor for hybrid electric vehicle. However, the conventional method has shortcomings in that only temperatures are considered in torque control in induction motor and it is insufficient to cope with factors such as saturation of magnetic flux of induction motor and changes in battery voltages, making it difficult to accurately control the torque of the induction motor.

SUMMARY

The present disclosure has been made to solve the foregoing disadvantages of the prior art, and therefore an object of certain embodiments of the present disclosure is to provide a system capable of enhancing accuracy of torque control of electric vehicle by solving control problem caused by saturation of magnetic flux of induction motor, parameters of induction motor and changes in battery voltages during torque control of induction motor in the electric vehicle, using a look-up table prepared in advance by simulation (a type of data table), and a method thereof.

Technical subjects to be solved by the present disclosure are not restricted to the above-mentioned description, and any other technical problems not mentioned so far will be clearly appreciated from the following description by the skilled in the art. That is, the present disclosure will be understood more easily and other objects, characteristics, details and advantages thereof will become more apparent in the course of the following explanatory description, which is given, without intending to imply any limitation of the disclosure, with reference to the attached drawings.

An object of the invention is to solve at least one or more of the above problems and/or disadvantages in whole or in part and to provide at least advantages described hereinafter. In order to achieve at least the above objects, in whole or in part, and in accordance with the purposes of the disclosure, as embodied and broadly described, and in one general aspect of the present invention, there is provided a system for controlling torque of induction motor in electric vehicle, the system comprising: a current command unit outputting d axis and q axis current commands ($i^*_d$, $i^*_q$) of stationary reference frame (or rest frame) from a power command and a rotation speed (ω) of the induction motor using a two dimensional look-up table, and outputting a mutual inductance (Lm) and a rotor torque (Tr) using an one dimensional look-up table based on the outputted d axis current command ($i^*_d$); a flux/current controller receiving the mutual inductance (Lm) and a rotor torque (Tr) from the current command unit to control a flux of the induction motor and to calculate a slip of a rotor, and based on which, to output d axis and q axis voltage command ($V^*_{dq}$) relative to the d axis and q axis current commands ($i^*_d$, $i^*_q$) from the current command unit; a PWM (Pulse Width Modulation)/gate driver receiving the d axis and q axis current commands ($i^*_d$, $i^*_q$) from the flux/current controller to modulate a pulse width and output a gate driving voltage of a transistor; and an inverter receiving the output from the PWM/gate driver to output an AC voltage for driving the induction motor.

Preferably, but not necessarily, the two dimensional look-up table is a type of data table of current command obtained through simulation from the power command and the rotation speed of the induction motor.

Preferably, but not necessarily, the one dimensional look-up table is a type of data table of the mutual inductance (Lm) and a rotor torque (Tr) from the current command unit obtained through simulation.

Preferably, but not necessarily, the flux/current controller includes a flux controller receiving the mutual inductance (Lm) outputted from the current command unit to control a flux of the induction motor based on the inputted mutual inductance (Lm), and a slip calculator receiving the rotor torque (Tr) outputted from the current command unit to calculate a slip of the rotor based on the inputted rotor torque (Tr).

In another general aspect of the present disclosure, there is provided a method for controlling torque of induction motor in electric vehicle including a current command unit, a flux/current controller, a PWM (Pulse Width Modulation)/gate driver and an inverter, the method comprising: (a) outputting, by the current command unit, d axis and q axis current commands ($i^*_d$, $i^*_q$) of stationary reference frame from a power command and a rotation speed of the induction motor using a two dimensional look-up table; (b) outputting, by the current command unit, a mutual inductance (Lm) and a rotor torque (Tr) using an one dimensional look-up table based on the outputted d axis current command ($i^*_d$); (c) receiving, by a flux/current controller, the mutual inductance (Lm) and a rotor torque (Tr) from the current command unit to control a flux of the induction motor and to calculate a slip of a rotor, and based on which, to output d axis and q axis voltage command ($V^*_{dq}$) relative to the d axis and q axis current commands ($i^*_d$, $i^*_q$) from the current command unit; (d) receiving, by a PWM (Pulse Width Modulation)/gate driver, the d axis and q axis current commands ($i^*_d$, $i^*_q$) from the flux/current controller to modulate a pulse width and output a gate driving voltage of a transistor; and (e) receiving, by an inverter, the output from the PWM/gate driver to output an AC voltage for driving the induction motor.

Preferably, but not necessarily, the two dimensional look-up table in (a) is a type of data table of current command obtained through simulation from the power command and the rotation speed of the induction motor.

Preferably, but not necessarily, the one dimensional look-up table in (b) is a type of data table of the mutual inductance (Lm) and a rotor torque (Tr) from the current command unit obtained through simulation.

The system and method for controlling torque of induction motor in electric vehicle according to the present disclosure has an advantageous effect in that torque control problems caused by saturation of magnetic flux, parameters of induction motor and changes in battery voltages during control of torque in the induction motor can be solved using a look-up table (a type of data table), thereby enhancing accuracy in torque control and improving travel performance and fuel efficiency of the electric vehicle.

BRIEF DESCRIPTION OF THE DRAWINGS

The accompanying drawings, which are included to provide a further understanding of the disclosure and are incorporated in and constitute a part of this application, illustrate embodiment(s) of the disclosure, and together with the description serve to explain the principle of the disclosure. In the drawings.

DETAILED DESCRIPTION

Various exemplary embodiments will be described more fully hereinafter with reference to the accompanying drawings, in which some exemplary embodiments are shown. The present inventive concept may, however, be embodied in many different forms and should not be construed as limited to the example embodiments set forth herein. Rather, these exemplary embodiments are provided so that this description will be thorough and complete, and will fully convey the scope of the present inventive concept to those skilled in the art.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Furthermore, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated.

Descriptions of well-known components and processing techniques are omitted so as to not unnecessarily obscure the embodiments of the disclosure.

Hereinafter, a system and method for controlling torque of induction motor in electric vehicle according to the present disclosure will be described in detail with reference to the accompanying drawings.

Figure 1:
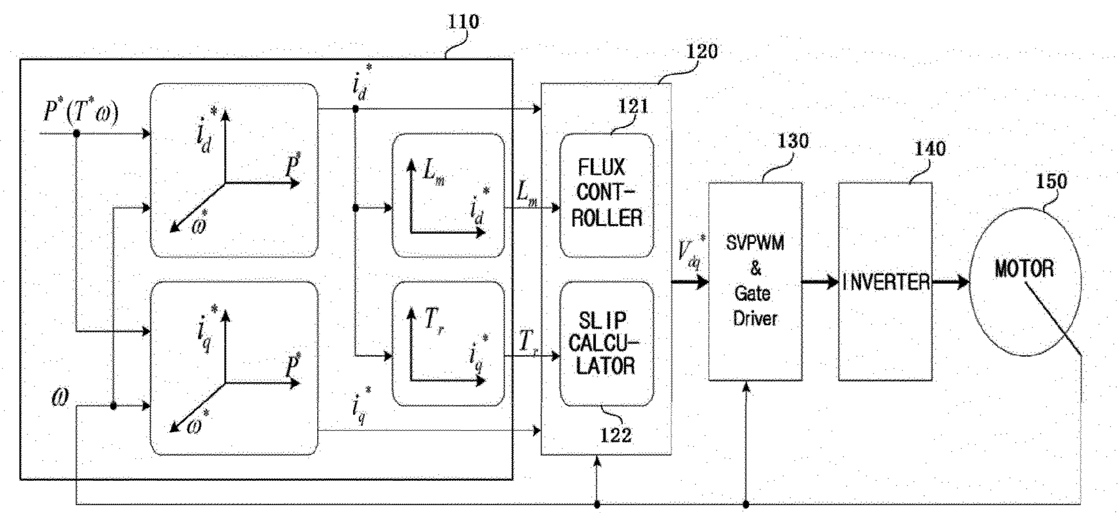
FIG. 1 is a schematic block diagram illustrating a system for controlling torque of induction motor in electric vehicle according to an exemplary embodiment of the present disclosure.

FIG. 1 is a schematic block diagram illustrating a system for controlling torque of induction motor in electric vehicle according to an exemplary embodiment of the present disclosure;

Referring to FIG. 1, a system for controlling torque of an induction motor (150) in electric vehicle (hereinafter referred to as torque control system) according to an exemplary embodiment of the present disclosure includes a current command unit (110), flux/current controller (120), a PWM/gate driver (130) and an inverter (140).

The current command unit (110) may output d axis and q axis current commands ($i^*_d$, $i^*_q$) of stationary reference frame from a power command and a rotation speed (ω) of the induction motor (150) using a two dimensional look-up table, and output a mutual inductance (Lm) and a rotor torque (Tr) using an one dimensional look-up table based on the outputted d axis current command ($i^*_d$), where the current command unit (110) may be configured with a single software module.

The flux/current controller (120) may receive the mutual inductance (Lm) and the rotor torque (Tr) from the current command unit (110) to control a flux of the induction motor (150) and to calculate a slip of a rotor. The flux/current controller (120) may also output d axis and q axis voltage command ($V^*_{dq}$) relative to the d axis and q axis current commands ($i^*_d$, $i^*_q$) from the current command unit by reflecting the control of flux or slip of the rotor, where the flux/current controller (120) may be configured with a single software module.

The PWM (Pulse Width Modulation)/gate driver (130) may receive the d axis and q axis current commands ($i^*_d$, $i^*_q$) from the flux/current controller to modulate a pulse width and output a gate driving voltage of a transistor (i.e., a transistor as a semiconductor switching element of an inverter to be described later), where the PWM (Pulse Width Modulation)/gate driver (130) may be configured with a SVPWM (Space Vector Pulse Width Modulation) gate driver.

The inverter (140) may receive the output from the PWM/gate driver to output an AC (Alternating Current) voltage for driving the induction motor, where the two dimensional look-up table used by the current command unit (110) may be a type of data table of current command obtained through simulation from the power command (P*) and rotation speed (ω) of induction motor (150) used by the current command unit, and the power command (P*) may be expressed by a multiplication of torque command (T*) and rotation speed (ω) of induction motor.

Furthermore, the one dimensional look-up table used by the current command unit (110) may be a type of data table of the mutual inductance (Lm) and a rotor torque (Tr) relative to current command {i.e., d axis current command ($i^*_d$)} obtained through simulation.

Still furthermore, the flux/current controller includes a flux controller (121) receiving the mutual inductance (Lm) outputted from the current command unit to control a flux of the induction motor based on the inputted mutual inductance (Lm), and a slip calculator (122) receiving the rotor torque (Tr) outputted from the current command unit (110) to calculate a slip of the rotor based on the inputted rotor torque (Tr).

Now, a method for controlling torque of induction motor in electric vehicle using a system for controlling torque of induction motor in electric vehicle thus configured according to the present disclosure will be described.

Figure 2:
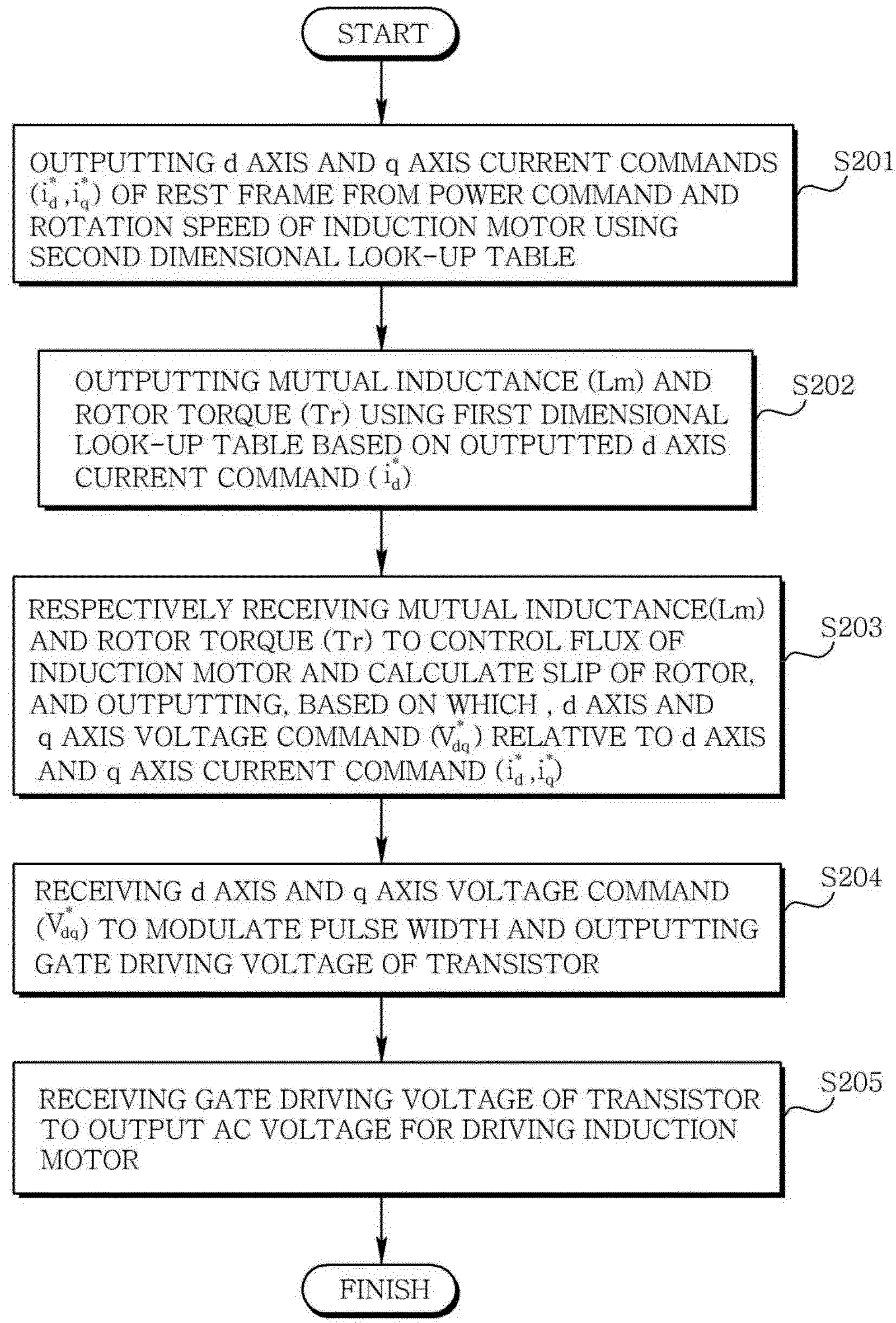
FIG. 2 is a flow chart illustrating a process of carrying out a method for controlling torque of induction motor in electric vehicle according to an exemplary embodiment of the present disclosure.

FIG. 2 is a flow chart illustrating a process of carrying out a method for controlling torque of induction motor in electric vehicle according to an exemplary embodiment of the present disclosure.

Referring to FIG. 2, the method for controlling torque of induction motor in electric vehicle according to an exemplary embodiment of the present disclosure is a method for controlling torque of induction motor in electric vehicle using the system for controlling torque of induction motor in electric vehicle that includes the current command unit (110), the flux/current controller (120), the PWM/gate driver (130) and the inverter (140).

First, d axis and q axis current commands ($i^*_d$, $i^*_q$) of stationary reference frame are outputted by the current command unit (110) from a power command (P*) and a rotation speed (ω) of the induction motor using a two dimensional look-up table (S201).

Figure 3:
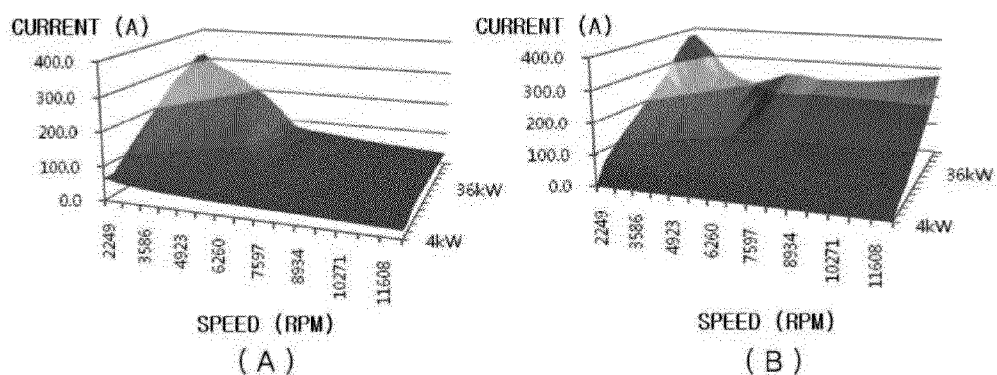
FIGS. 3 and 4 are schematic views illustrating a two dimensional look-up table outputting a power command and a current command according to a method for controlling torque of induction motor in electric vehicle according to an exemplary embodiment of the present disclosure.
Figure 4:
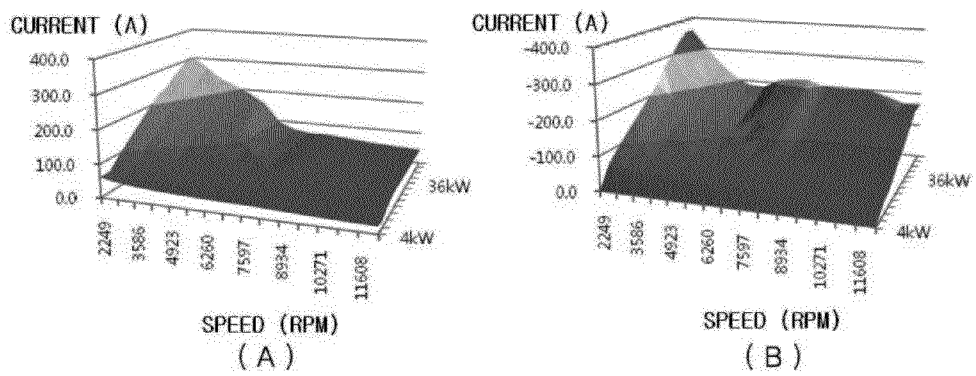

FIGS. 3 and 4 are schematic views illustrating a two dimensional look-up table outputting a power command and a current command from the rotation speed (ω) of the induction motor, by being calculated in advance to effectively use a current and a voltage from surveyed data, where FIG. 3 (A) shows a motor operation d axis current command, FIG. 3(B) shows a motor operation q axis current command, FIG. 4(A) shows a regenerative operation d axis current command, and FIG. 4(B) shows a regenerative operation q axis current command.

At this time, the two dimensional look-up table may be a type of a current command data table outputting a current command from the power command (P*) and rotation speed (ω) of induction motor, and the current command data table is pre-obtained through simulation by a system designer of the present disclosure.

Meanwhile, the power command (P*) is a multiplication of torque command (T*) and rotation speed (ω) of induction motor, where, if a DC-link voltage is changed at the inverter (140), an outputtable current command is generated from the given DC-link voltage by changing a motor rotation speed which is another input of the two dimensional look-up table in response to ratio relative to a standard voltage. Furthermore, the current command is calculated to move along an MTPA (Maximum Torque Per Ampere) curve and an MFPT (Maximum Flux Per Torque) curve to minimize copper loss and to increase a voltage usage.

In a case the d axis and q axis current commands ($i^*_d$, $i^*_q$) of stationary reference frame are outputted based on the foregoing, a mutual inductance (Lm) and a rotor torque (Tr) are outputted by the current command unit, using an one dimensional look-up table based on the outputted d axis current command ($i^*_d$) (S202), where the one dimensional look-up table used by the current command unit (110) may be a type of data table of the mutual inductance (Lm) and a rotor torque (Tr) relative to current command obtained through simulation.

Figure 5:
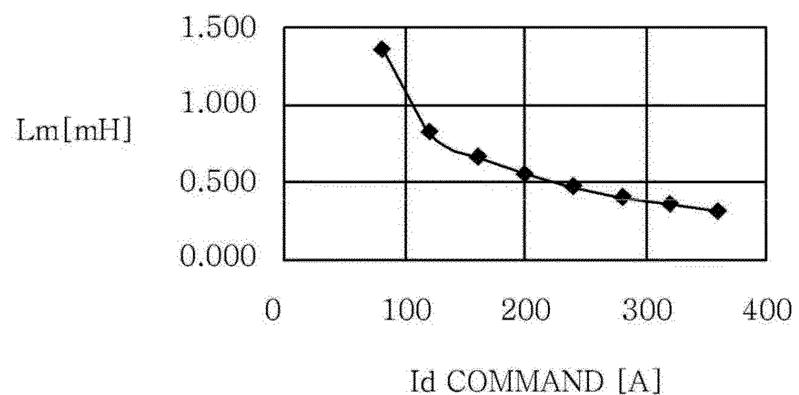
FIG. 5 is a schematic view illustrating an one dimensional look-up table outputting a mutual inductance (Lm) based on d axis current command according to a method for controlling torque of induction motor in electric vehicle according to an exemplary embodiment of the present disclosure.
Figure 6:
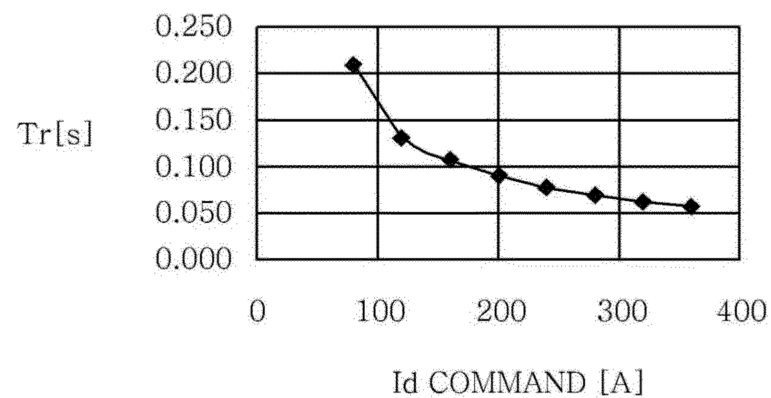
FIG. 6 is a schematic view illustrating an one dimensional look-up table outputting a rotor torque (Tr) based on d axis current command according to a method for controlling torque of induction motor in electric vehicle according to an exemplary embodiment of the present disclosure

FIG. 5 is a schematic view illustrating an one dimensional look-up table outputting a mutual inductance (Lm) based on d axis current command according to a method for controlling torque of induction motor in electric vehicle according to an exemplary embodiment of the present disclosure, and FIG. 6 is a schematic view illustrating an one dimensional look-up table outputting a rotor torque (Tr) based on d axis current command according to a method for controlling torque of induction motor in electric vehicle according to an exemplary embodiment of the present disclosure.

The one dimensional look-up table outputting the mutual inductance (Lm) enables an accurate control in consideration of saturation of flux during flux weakening control. Furthermore, the two dimensional look-up table outputting the rotor torque (Tr) of FIG. 6 can enhance accuracy of torque control in consideration of changes in the parameters of the motor during indirect vector control.

That is, the mutual inductance (Lm) which is an output of the one dimensional look-up table corrects a measurement error of the surveyed data of the two dimensional look-up table, which is reflected as an input of the flux controller (121) enabling the flux weakening control to enable the flux weakening control in consideration of saturation of flux.

Furthermore, the other one dimensional look-up table outputs the rotor torque (Tr) to be used in calculation of slip during indirect vector control, whereby an accurate torque control is possible by reflecting the saturation of flux and changes in the parameters caused by temperature change in the motor.

Meanwhile, in a case the mutual inductance (Lm) and rotor torque (Tr) thus configured are outputted, the flux/current controller (120) receives the mutual inductance (Lm) and rotor torque (Tr) from the current command unit (110) to control the flux of the induction motor (150) and to calculate the slip of the rotor, and output, based on which, the d axis and q axis voltage command ($V^*_{dq}$) relative to the d axis and q axis current commands ($i^*_d$, $i^*_q$) from the current command unit is outputted (S203).

Successively, the PWM (Pulse Width Modulation)/gate driver (130) receives the d axis and q axis current commands ($i^*_d$, $i^*_q$) from the flux/current controller (120) to modulate a pulse width and output a gate driving voltage of a transistor {transistor as a semiconductor switching element of the inverter (140) to be described later} (S204).

Thereafter, the inverter (140) receives the output from the PWM/gate driver (130) to output an AC voltage for driving the induction motor (150) (S205).

The previous description of the present invention is provided to enable any person skilled in the art to make or use the invention. Various modifications to the invention will be readily apparent to those skilled in the art, and the generic principles defined herein may be applied to other variations without departing from the spirit or scope of the invention. Thus, the invention is not intended to limit the examples described herein, but is to be accorded the widest scope consistent with the principles and novel features disclosed herein.

As apparent from the foregoing, the system and method for controlling torque of induction motor in electric vehicle have an industrial applicability in that an accurate torque control that reflects saturation of flux in an induction motor and parameter changes in a wide voltage range at an inverter DC-link can be enabled by solving control problems caused by the saturation of flux and changes in parameter and battery voltages during control of torque of an induction motor of an electric vehicle, using the two and one look-up tables (types of data tables), whereby travel performance and fuel consumption in the electric vehicle can be improved.

What is claimed is:

1. A system for controlling torque of induction motor in electric vehicle, the system comprising: a current command unit outputting d axis and q axis current commands ($i^*_d$, $i^*_q$) of stationary reference frame from a power command and a rotation speed (ω) of the induction motor using a two dimensional look-up table, and outputting a mutual inductance (Lm) and a rotor torque (Tr) using an one dimensional look-up table based on the outputted d axis current command ($i^*_d$); a flux/current controller receiving the mutual inductance (Lm) and a rotor torque (Tr) from the current command unit to control a flux of the induction motor and to calculate a slip of a rotor, and based on which, to output d axis and q axis voltage command ($V^*_{dq}$) relative to the d axis and q axis current commands ($i^*_d$, $i^*_q$) from the current command unit; a PWM (Pulse Width Modulation)/gate driver receiving the d axis and q axis current commands ($i^*_d$, $i^*_q$) from the flux/current controller to modulate a pulse width and output a gate driving voltage of a transistor; and an inverter receiving the output from the PWM/gate driver to output an AC voltage for driving the induction motor.

2. The system of claim 1, wherein the two dimensional look-up table is a type of data table of current command obtained through simulation from the power command and the rotation speed of the induction motor.

3. The system of claim 1, wherein the one dimensional look-up table is a type of data table of the mutual inductance (Lm) and a rotor torque (Tr) from the current command unit obtained through simulation.

4. The system of claim 1, wherein the flux/current controller includes a flux controller receiving the mutual inductance (Lm) outputted from the current command unit to control a flux of the induction motor based on the received mutual inductance (Lm), and a slip calculator receiving the rotor torque (Tr) outputted from the current command unit to calculate a slip of the rotor based on the received rotor torque (Tr).

5. A method for controlling torque of induction motor in electric vehicle including a current command unit, a flux/current controller, a PWM (Pulse Width Modulation)/gate driver and an inverter, the method comprising: (a) outputting, by the current command unit, d axis and q axis current commands ($i^*_d$, $i^*_q$) of stationary reference frame from a power command and a rotation speed of the induction motor using a two dimensional look-up table; (b) outputting, by the current command unit, a mutual inductance (Lm) and a rotor torque (Tr) using an one dimensional look-up table based on the outputted d axis current command ($i^*_d$); (c) receiving, by a flux/current controller, the mutual inductance (Lm) and a rotor torque (Tr) from the current command unit to control a flux of the induction motor and to calculate a slip of a rotor, and based on which, to output d axis and q axis voltage command ($V^*_{dq}$) relative to the d axis and q axis current commands ($i^*_d$, $i^*_q$) from the current command unit; (d) receiving, by a PWM (Pulse Width Modulation)/gate driver, the d axis and q axis current commands ($i^*_d$, $i^*_q$) from the flux/current controller to modulate a pulse width and output a gate driving voltage of a transistor; and (e) receiving, by an inverter, the output from the PWM/gate driver to output an AC voltage for driving the induction motor.

6. The method of claim 5, wherein the two dimensional look-up table in (a) is a type of data table of current command obtained through simulation from the power command and the rotation speed of the induction motor.

7. The method of claim 5, wherein the one dimensional look-up table in (b) is a type of data table of the mutual inductance (Lm) and a rotor torque (Tr) from the current command unit obtained through simulation.

* * * * *